United States Patent [19]

Sherbeck

[11] Patent Number: 4,703,316
[45] Date of Patent: Oct. 27, 1987

[54] TOUCH PANEL INPUT APPARATUS

[75] Inventor: Terry G. Sherbeck, Hillsboro, Oreg.

[73] Assignee: Tektronix, Inc., Beaverton, Oreg.

[21] Appl. No.: 662,319

[22] Filed: Oct. 18, 1984

[51] Int. Cl.[4] .............................................. G09G 1/16
[52] U.S. Cl. .................................... 340/706; 340/712; 340/365 P; 250/221; 178/18
[58] Field of Search .................... 340/712, 706, 365 P; 250/221, 549; 78/18

[56] References Cited

U.S. PATENT DOCUMENTS

| | | | |
|---|---|---|---|
| 3,860,754 | 1/1975 | Johnson et al. | 178/18 |
| 4,247,767 | 1/1981 | O'Brien et al. | 340/365 P |
| 4,294,543 | 10/1981 | Apple et al. | 178/18 |
| 4,313,109 | 1/1982 | Funk et al. | 340/712 |
| 4,346,376 | 8/1982 | Mallos | 340/712 |
| 4,507,557 | 3/1985 | Tsikas | 250/221 |
| 4,558,313 | 12/1985 | Garwin et al. | 340/365 P |

Primary Examiner—Marshall M. Curtis
Assistant Examiner—Mahmoud Fatahiyar
Attorney, Agent, or Firm—George T. Noe

[57] ABSTRACT

A touch panel input apparatus including two arrays of light detectors placed on the opposite sides of the display device screen and four light sources, each of which is placed at a corner and at angle to illuminate at least the entire array of the light detectors on the opposite side. The light detectors are scanned in synchronization with the selection of the light beam sources. A controlling microprocessor has stored in its memory four sets of data, one for each light source, regarding ambient light condition and beam interrupt thresholds for the light detectors. By software, two equations representing a line are determined and solved to obtain a cross point which corresponds to X-Y position of the finger on the screen.

7 Claims, 6 Drawing Figures

TOUCH PANEL INPUT APPARATUS

FIELD OF THE INVENTION

The present invention relates to a touch panel input apparatus, and in particular to an infrared light beam touch panel input apparatus for a display device.

BACKGROUND OF THE INVENTION

While touch panels or touch screens have been extant for more than a decade, they are suddenly gaining popularity for use with interactive display devices, such as computer trminals and electronic test and measurement equipment. Touch panels have been implemented in a variety of different methods, including touch-sensitive capacitive areas, pressure sensitive screens, and "break-the-beam" light matrices for sensing X-Y screen coordinates. Most popular of these because it has the least operational problems and is easiest to implement is the "break-the-beam" type, which comprises an array of paired light emitting diodes (LEDs) and phototransistors on four sides of a display screen to form an X-Y light-beam grid that is sequentially scanned in repetitive cycles. When a light beam is interrupted by an obstacle, such as a stylus or a finger, the X-Y coordinate point is electronically decoded and sent to a computer.

A problem associated with light-beam matrix touch panels is the large number of components required, particularly if high resolution is desired. It would be desirable to retain high resolution while reducing the part count, thereby lowering power consumption, reducing scan cycle times, and reducing manufacturing costs.

SUMMARY OF THE INVENTION

In accordance with the present invention, a touch panel input apparatus has light detectors placed in two opposing rows with a light beam source at each of the four corners. Each light beam source is placed at an angle with respect to the row of light detectors to illuminate the entire row of light detectors on the opposite side. Each light detector is sequentially selected in synchronization with the selection of the associated light beam source under control of a microprocessor. The outputs of the light detectors are provided to the microprocessor through an analog-to-digital converter (ADC). Several light detectors sense light blockage in the form of a shadow when a finger or other object is placed on a touch panel. The entire scanning process is repeated until all light detectors are scanned. The microprocessor random-access memory (RAM) contains four sets of decoded data one for each light source, to indicate whether or not a light detector receives light. The program determines a middle point of each shadow along the row of light detectors, and two equations representing lines from the middle points, or y-intercept in a preferred embodiment, and the position of the light source. The two equations are then solved as two equations with two unknowns for the X, Y location of the finger on the touch panel.

It is therefore one feature of the present invention to provide a touch panel input apparatus with reduced number of light sources.

It is another feature of the present invention to provide a touch panel apparatus which has a shortened scan cycle time.

Other features and attainment of the present invention will become apparent to those skilled in the art upon a reading of the following detailed description when taken in conjunction with the drawings.

DETAILED DESCRIPTION OF THE INVENTION

Figure 1:
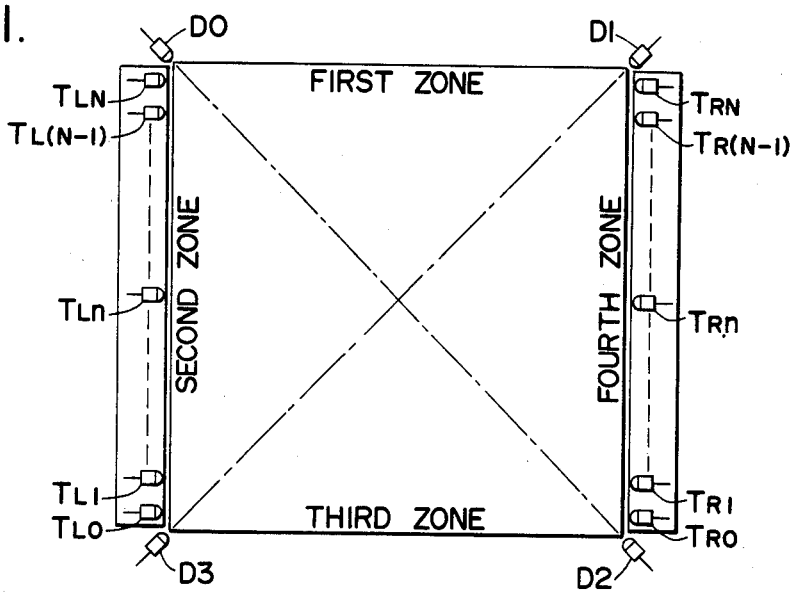
FIG. 1 is a schematic illustration of a panel section of the touch panel input apparatus in accordance with the present invention.

Referring to FIG. 1, there is illustrated a touch panel section of a touch panel input apparatus according to the present invention. The touch panel section comprises two linear arrays of light detectors such as phototransistors, represented by $T_R$ and $T_L$ which are respectively disposed along right and left side of a display device such as a cathode ray tube, and additionally comprises four infrared light emitters such as light emitting diodes (LEDs) represented by D0 through D3, which are respectively disposed adjacent to four corners of the display. The phototransistors $T_R$ and $T_L$ are numbered from bottom to top, wherein N is the total number of the phototransistors in each row. The LED's and phototransistors are suitably mounted on a rectangular frame (not shown) placed adjacent to the display device. The LED at each corner is placed at an angle with respect to the row of phototransistors on the opposite side so as to illuminate all of them.

The display area between the two arrays consisting of the light emitting/detection elements is divided into four zones in accordance with a point where the light paths of two LED's illuminating the phototransistors cross each other. In a first zone, the light paths of LED's D0 and D1, which are respectively placed adjacent to the top corners of the left and right sides, fill the entire zone in overlapping fashion. In a second zone, the light paths of LED's D1 and D2, which are respectively placed adjacent to the top and bottom corners of the right side, fill the entire zone in overlapping fashion. In a third zone, the light path of LED's D2 and D3, which are respectively placed adjacent to the bottom corners of the right and left sides, fill the entire zone in overlapping fashion. In a fourth zone, the light path of LED's D3 and D0, which are respectively placed adjacent to the bottom and top corners of the left side, fill the entire zone in overlapping fashion. Note from the example shown in FIG. 3 that when a finger is placed in the first zone, or Zone 1, the beam from LED $D_0$ is interrupted and a shadow cast onto the right-hand phototransistor array, while the beam from LED $D_1$ is interrupted and a shadow cast onto the left-hand phototransistor array. In other words, the shadows are cast onto opposite sides of the display area. The same situation arises when a finger is placed in the third zone, or Zone 3. Now, note from the example shown in FIG. 4 that when a finger is placed in the second zone, or Zone 2, the light beams from both LEDs $D_1$ and $D_2$ are interrupted and both shadows are cast onto the left-hand phototransistor array and such shadows may overlap if the finger is close enough to the edge of the display. It can be appreciated that if a finger is placed in the fourth zone, or Zone 4, the light beams from both LEDs $D_0$ and $D_3$ are interrupted and both shadows are cast onto the right-hand phototransistor array.

Figure 2:
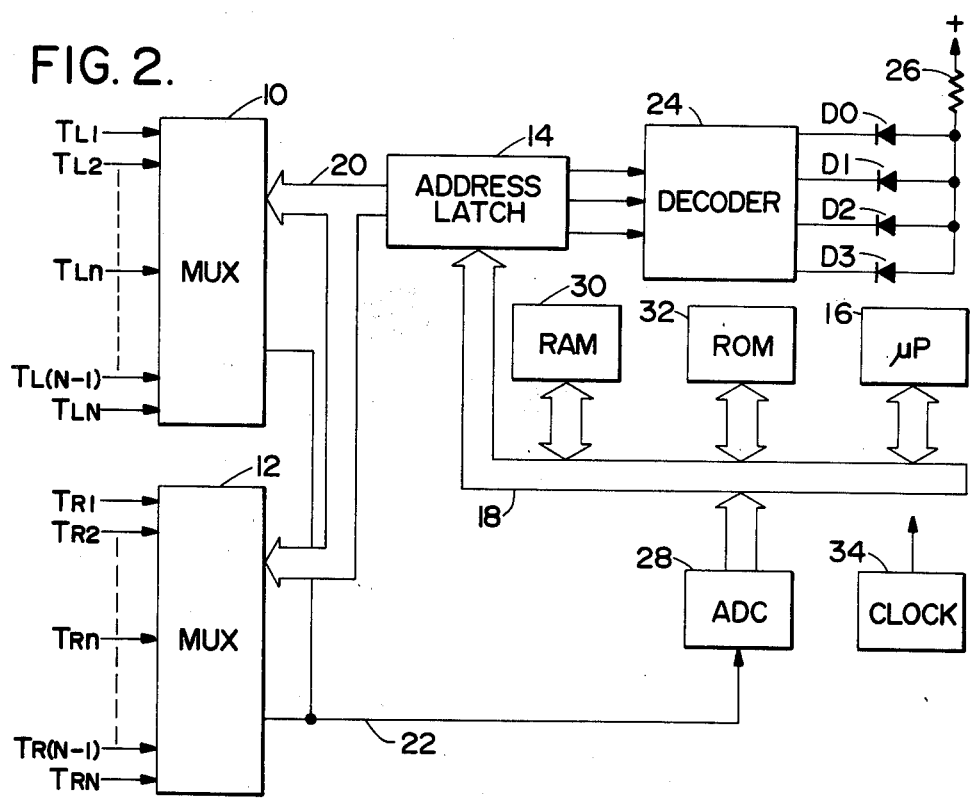
FIG. 2. is a block diagram of a position encoding circuit of the touch panel input apparatus in accordance with the present invention.

FIG. 2 shows a block diagram of position encoding circuit for driving the light emitters and detectors and encoding X and Y positions. Multiplexers 10 and 12 respectively have a plurality of inputs corresponding to the number of phototransistors in a particular array along one edge of a display area. Each input of the multiplexer 10 is connected to an output of one of the phototransistors $T_L$. Similarly, each input of the multiplexer 12 is connected to an output of a phototransistor $T_R$. Address latch 14 receives a binary code from a microcomputer 16 via a bus 18 and provides it to the inputs of each of the multiplexers 10 and 12 via a bus 20 so that one of the multiplexers is sequentially selected and one of the inputs of the selected multiplexer is selected for connection to an output line 22 in accordance with the binary code signal from the address latch 14. The address latch 14 has other outputs of a binary code, controlled by the microprocessor, applied to a decoder 24 with four outputs connected to the cathodes of LED's D0 through D3. The anodes of all four LED's are connected together to a positive voltage source via a resistor 26. The binary code at the inputs of the decoder 24 consists of three bits, in which two bits are for selecting one of four LED's for illumination and one bit is for enable/inhibit operation of the decoder 24. The selection of the LED's is synchronized with the scanning of the phototransistors.

The outputs of the multiplexers 10 and 12 are provided to an converter (ADC) 28, which converts the instantaneous value of the analog signal to m-bit parallel digital data provided to the microprocessor 16 via the bus 18. A random access memory (RAM) 30 and a read only memory (ROM) 32 are coupled to microprocessor 16 via the bus 18. The program described later is written in the ROM 32. Clock generator 34 provides clock timing signals to all of the aforementioned blocks.

Figure 3:
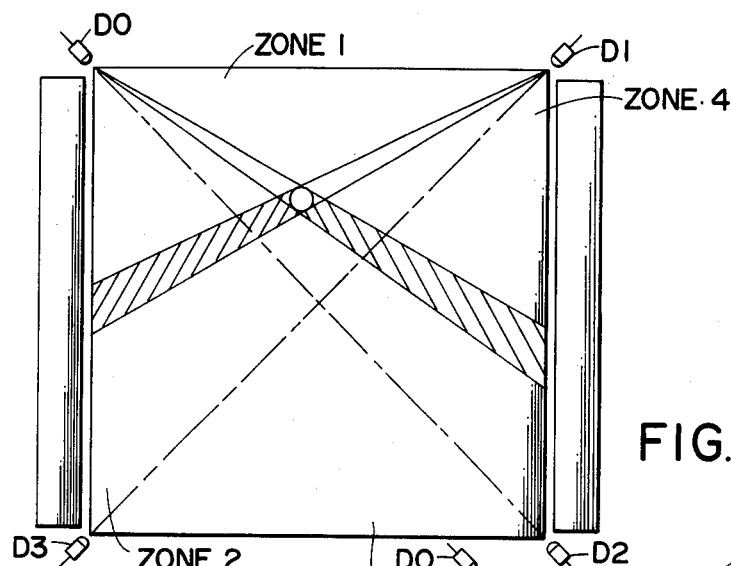
FIGS. 3, 4 and 5 are schematic illustrations to facilitate an understanding of the operation of the present invention.
Figure 4:
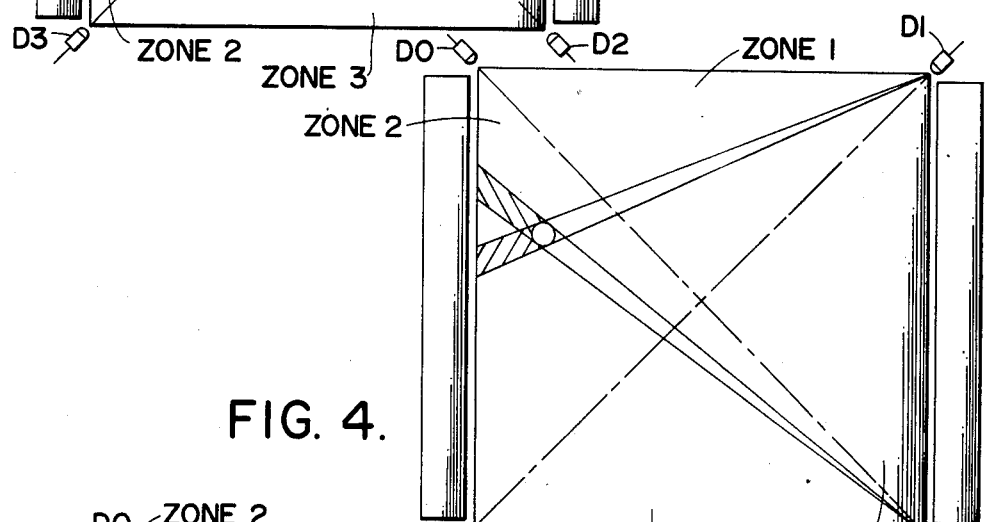

The operation of the apparatus will be described in conjunction with the flow chart illustrated in FIG. 6 and the schematics of FIGS. 3, 4 and 5. During power up, the microprocessor 16 scans the phototransistor arrays twice. The first scan cycle is done while all of the LED's are turned off. The output of each phototransistor indicates the background level thereof caused by ambient light and is stored in the RAM 30 via the ADC 28. The second scan cycle is done after enabling the decoder 24 while each of the phototransistor arrays is illuminated by either LED on the opposite side with the assumption that there is no finger on the touch panel. The output of each phototransistor indicates the maximum level thereof and is similarly converted to a digital value by the ADC 28. The background level is subtracted from the maximum level by the microprocessor 16 to give the response range of each of the phototransistors. The reference level is calculated as a percent of this range and stored in the RAM 30 with respect to each of the phototransistors. According to this embodiment, an absolute minimum amount of change is not needed because the ADC 28 allows the use of DC coupling rather than AC coupling from the multiplexer 12 to the microprocessor 16. Although any scanning sequence of the phototransistors may be selected, in this embodiment the bottom right phototransistor $T_{R0}$ and the upper left LED D0 are selected first by the multiplexer 12 and the decoder 24. Turning on LED D0, the output of phototransistor $T_{R0}$ is passed through the ADC 28. When a finger interrupts a sufficient amount of light from LED D0, the signal output of phototransistor $T_{R0}$ decreases by an electrically detectable amount. The microprocessor 16 compares the output of the ADC 28 with a reference value programmably stored in RAM 30 according to a percent of the response range that was determined at power up. RAM 30 has four divided data areas for four LED's, each of which has addresses corresponding to the number of phototransistors on one side array. The microprocessor transfers the result of the comparison to each of the memory addresses of RAM 30. The information regarding the LED D0 is stored into a first data area of RAM 30. Next, lower left LED D3 is turned on and LED D0 is turned off, then the output of the same transistor $T_{R0}$ is passed through the ADC 28. Similarly, the output of the ADC 28 is compared with the reference value in the RAM 30 and the result of comparison is stored into a second data area. Successively, the bottom left transistor $T_{L0}$ is selected and the LED's D1 and D2 are turned on in order. The results of comparison to provide information regarding LED's D1 and D2 are respectively stored into third and fourth areas of RAM 30. This procedure is repeated with respect to all of phototransistors from bottom to top. This scanning procedure allows for the fastest scan possible, since the LED's have a very low duty cycle. Now, the RAM 30 has four sets of data, one for each LED, indicating whether or not a phototransistor received light illuminating it from a respective LED. When a finger touches on the touch panel, the data indicates two or more light interruptions.

The X-Y position where the finger touches can be calculated from the known positions of the LED's and the middle point of light interrupted area. If the finger interrupts the light for an odd number of phototransistors, the middle address of the light interrupted address block corresponds to the center point. If an even number of phototransistors is interrupted, the middle point of the light interrupted area corresponds to half way between the light interrupted address block. Each light path of the LED's is indicated by an equation of the form $Y=mx+b$, which contains the slope m and y − intercept b. The equations for the LED's are represented as follows:

$$\text{Eq 0 (for LED } D0) \quad Y = \frac{Y_{UL} - Y_U}{X_R - X_D} X + Y_U$$

$$\text{Eq 1 (for LED } D1) \quad Y = \frac{Y_U - Y_{UR}}{X_R - X_L} X + Y_{UR}$$

$$\text{Eq 2 (for LED 2)} \quad Y = \frac{Y_L - Y_{LR}}{X_R - X_L} X + Y_{LR}$$

$$\text{Eq 3 (for LED 3)} \quad Y = \frac{Y_{LL} - Y_L}{X_R - X_L} X + Y_L$$

wherein:
$Y_{UL}$: Y—intercept from upper left LED to other side
$Y_{UR}$: Y—intercept from upper right LED to other side
$Y_{LR}$: Y—intercept from lower right LED to other side
$Y_{LL}$: Y—intercept from lower left LED to other side
$X_R$: X coodinate at right end
$X_L$: X coordinate at left end
$Y_U$: Y coordinate at upper end $Y_L$: Y coordinate at lower end The two equations are solved to obtain a cross point, which is the X-Y position of the finger. When the finger is placed in the first zone, the equations Eq0 and Eq1 provide the X-Y position of the finger; the second zone, the equations Eq1 and Eq2; the third zone, the equations Eq2 and Eq3; the fourth zone, the equations Eq3 and Eq0.

Figure 5:
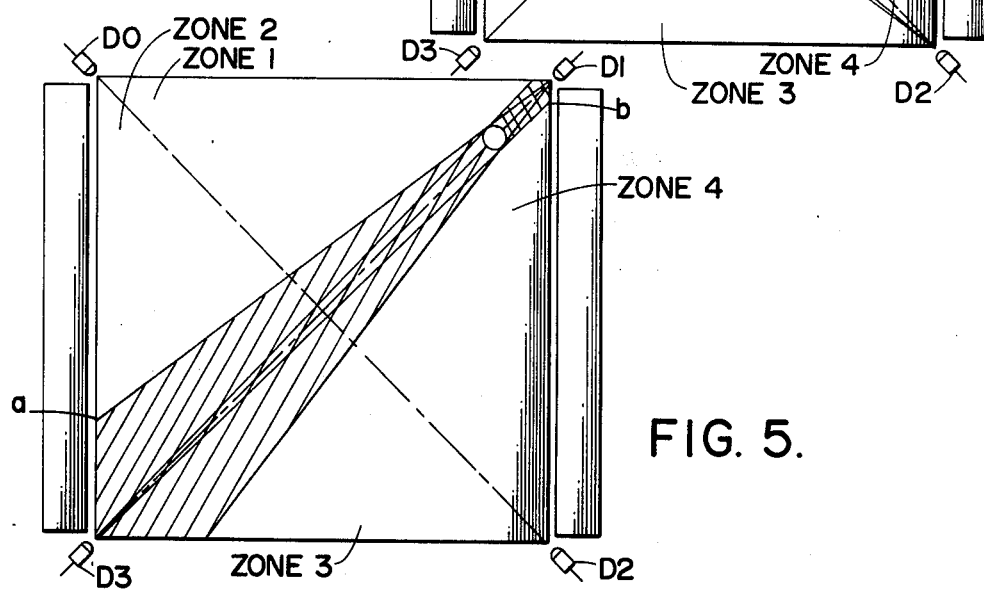
Figure 6A:
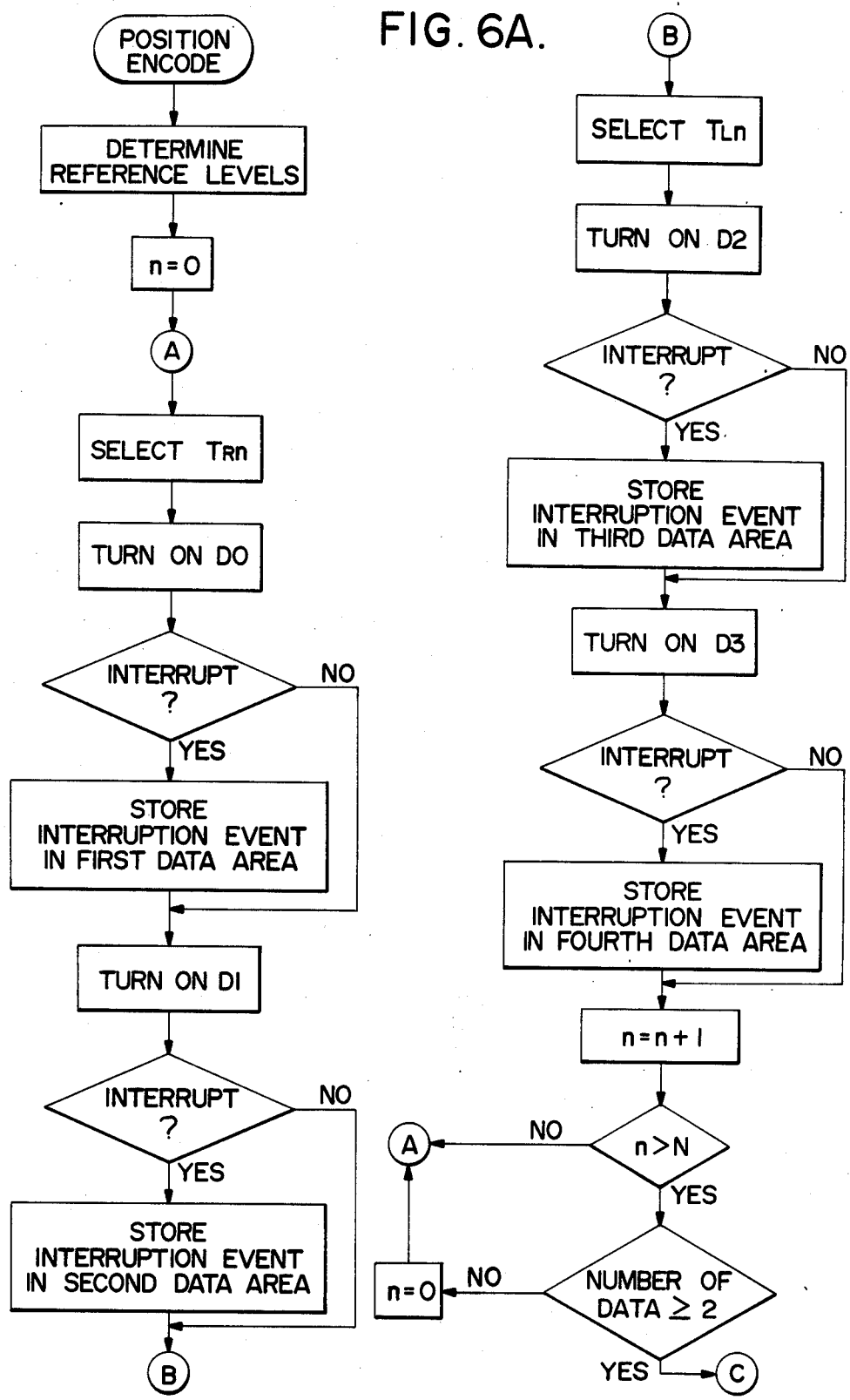
FIG. 6 is a flow chart to facilitate an understanding of the operation of the present invention.
Figure 6B:
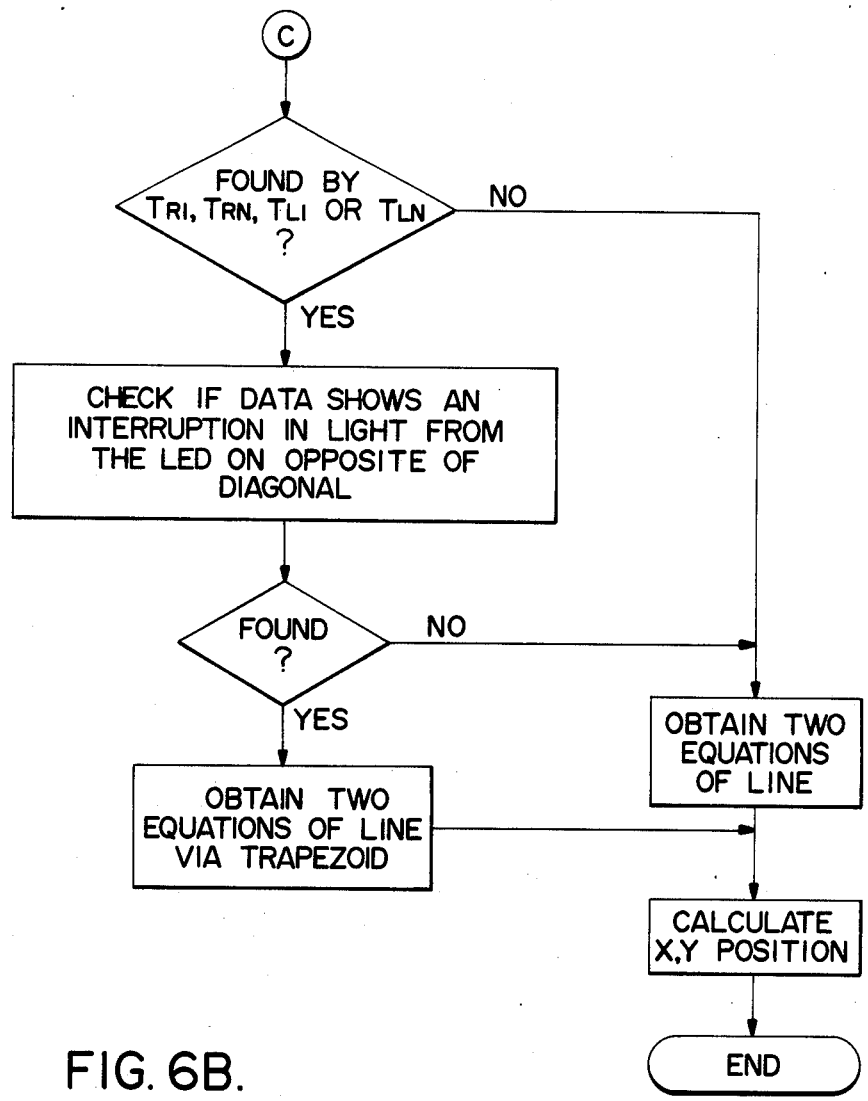

When the finger is placed on or adjacent to the diagonal line of the touch panel, the shadow cast by the finger is not completely over the flow of phototransistors, as is shown in FIG. 5. In this case, the equations Eq0 and Eq1 which indicate the lines passing through the middle points of the shadow portion, provide an erroneous X-Y position because the line defined by the equation Eq1 does not pass on the center of the touched portion. To solve this problem, the microprocessor checks whether or not the light is interrupted at the edge of the transistor array after the scanning operation. In FIG. 5, the shadow is at lower edge of the left side transistor array when the LED D1 is turned on. When the microprocessor 16 detects the shadow at the edge, it then turns on the LED D3. The finger interrupts the light from the LED D3 and makes a shadow over the upper right transistors. With the edge of shadows on left and right side represented respectively by points a and b, it becomes apparent that points a, b and the lower left and the upper right edge make a trapezoid. Therefore, the line passing on the middle point between the point a and the lower left edge and the middle point between the point b and the upper left edge, passes on the center of the touched portion. The equation representing the center line of the trapezoid is obtained by the stored data. The equation Eq0 and the additional equation provide the correct X-Y position of the finger. If the shadow is not thrown on the right side when turning on the LED D3, it means that the edge of the shadow regarding the LED D1 is just on the bottom left phototransistor. In this case, the X-Y position is provided by the equations Eq0 and Eq1 in the aforementioned manner.

In the foregoing, the present invention has been described with such particularity to enable others skilled in the art to make and use the same, without departing from the essential feature of novelty of the present invention. For example, the location of each edge of the shadow on the phototransistor array may be stored in the RAM 30 instead of storing the interrupt or non-interrupt state of each phototransistor. However, this method requires longer processor time between scans of the phototransistor to determine whether an edge of the shadow had been found or not.

What is claimed is:

1. A touch panel input apparatus disposed adjacent to the surface of a generally rectangular display area, comprising:
   only two linear arrays of light detecting means, each array placed along an opposite side of the display area;
   four light emitting means, each placed adjacent a corner of the display area and when energized illuminating the linear array of light detecting means on the opposite side of the display area in such a manner that four detection zones are provided, each detection zone being defined by illumination from only two light-emitting means;
   driving means for sequentially activating selectable pairs of light emitting means and light detecting means to scan the surface of the display area;
   position encoding means responsive to the outputs of the light detecting means for detecting an interruption of light from said light emitting means and encoding data representing the activated pair of light emitting means and light detecting means for which an interruption is detected; and
   means responsive to the encoded data for providing the interrupted X-Y position by mathematical calculation.

2. A touch panel input apparatus according to claim 1, wherein said light emitting means is a light emission diode.

3. A touch panel input apparatus according to claim 1, wherein said light detecting means is a phototransistor.

4. A touch panel input apparatus according to claim 1 wherein said driving means comprises multiplexer means having a plurality of inputs each connected to the output of a light detecting means, decoder means having four outputs each connected to a light emitting means, and means for providing a selection signal to said multiplexer means and said decoder means for activating said selectable pairs of light emitting means and light detecting means.

5. A touch panel input apparatus according to claim 1 wherein said position encoding means includes comparison means for comparing the outputs of said light detecting means with a reference level to provide a detected interruption, and storing means for storing said encoded data.

6. A touch panel input apparatus according to claim 5 wherein said means responsive to the encoded data for providing the interrupted X-Y position by mathematical calculation comprises a microprocessor and a read only memory containing a program for controlling said driving means and calculating said X-Y position.

7. A touch panel input apparatus according to claim 5, wherein said storing means is a random access memory.

* * * * *